United States Patent
Anderson

[11] 3,892,380
[45] July 1, 1975

[54] MEANS AND METHOD FOR PREFABRICATING AND CONVEYING CERAMIC PANELS

[75] Inventor: Yngve R. Anderson, Streetsville, Canada

[73] Assignee: Canadian Structural Clay Association, Willowdale, Canada

[22] Filed: Dec. 22, 1972

[21] Appl. No.: 317,598

Related U.S. Application Data
[62] Division of Ser. No. 109,760, Jan. 26, 1971, abandoned.

[52] U.S. Cl. .................. 249/83; 425/63; 425/451; 425/455
[51] Int. Cl. ..................... B22d 19/00; B22d 33/00
[58] Field of Search ....... 425/62, 63, 451, 404, 455; 249/83, 137, 160; 214/6 A, 6 DK

[56] References Cited
UNITED STATES PATENTS

| | | | |
|---|---|---|---|
| 1,623,625 | 4/1927 | Lake | 425/439 X |
| 1,809,504 | 6/1931 | Carvel | 249/83 X |
| 2,574,915 | 11/1951 | Fuller | 249/160 X |
| 2,576,375 | 11/1951 | Williams | 264/334 X |
| 3,483,065 | 12/1969 | O'Brien | 214/6 DK X |
| 3,487,954 | 1/1970 | Pearne | 425/404 X |
| 3,640,046 | 2/1972 | Anderson et al. | 52/749 |
| 3,642,395 | 2/1972 | Dreher | 249/18 X |

Primary Examiner—Francis S. Husar
Assistant Examiner—R. J. Charvat
Attorney, Agent, or Firm—C. C. Kent; K. M. Hill

[57] ABSTRACT

Apparatus for, facilitating the prefabrication of ceramic panels comprises for use in combination with a mortar-setting tilting table, a travelling prefabricating and transfer table movable alongside said tilting table, a take-apart brick panelled frame and brick spacing templet therein initially put together on the travelling table, a panel and frame pusher assembly for transferring the panel and frame onto said tilting table, means for train-hauling completed panels to a curing and storage area after being dried and tilted into the vertical on the tilting table, and means for stripping-off the templet while the panels are being train-hauled.

3 Claims, 5 Drawing Figures

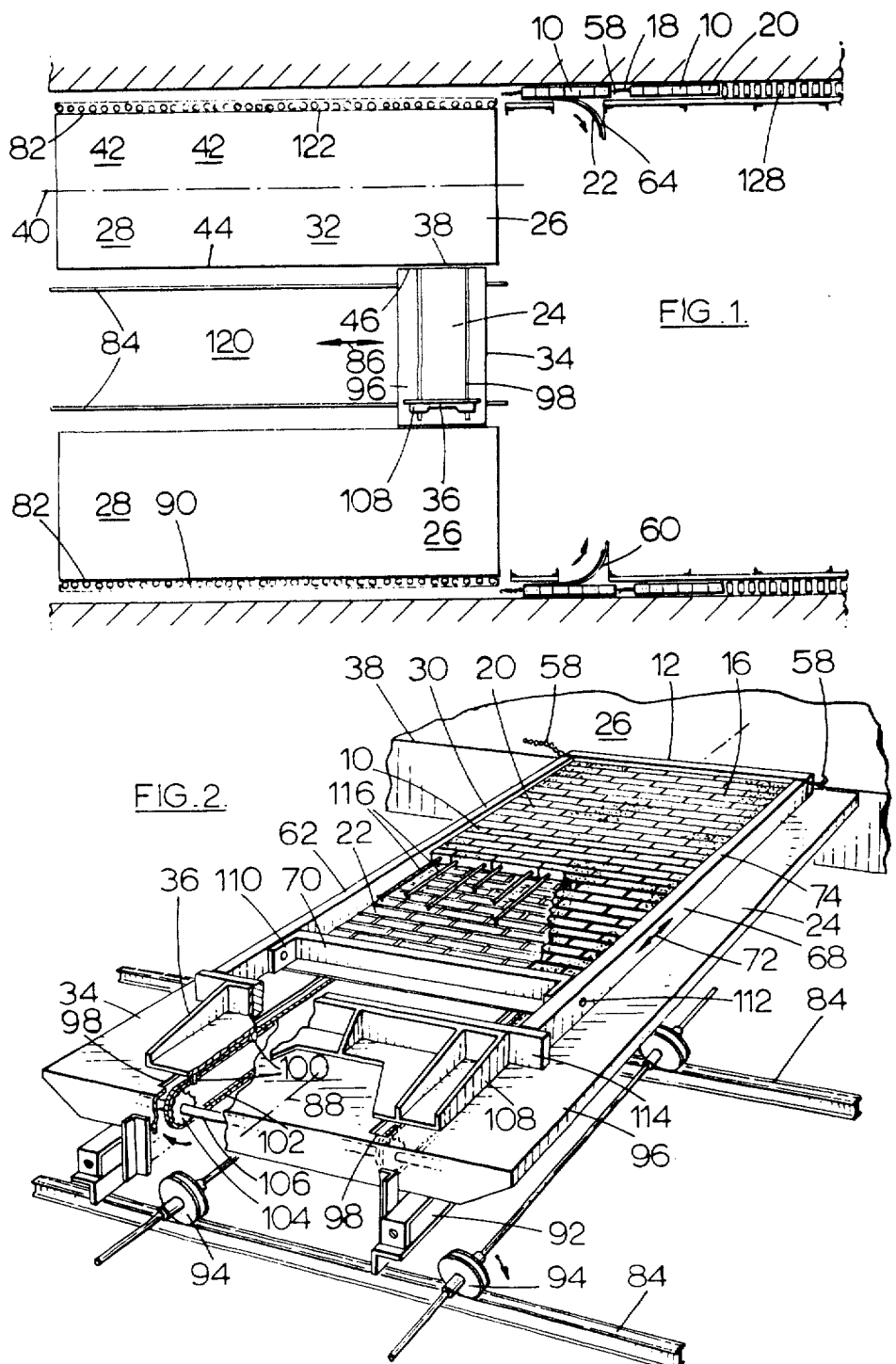

INVENTOR
YNGVE R. ANDERSON
BY Cecil C Kent
ATTORNEY 3,892,380

MEANS AND METHOD FOR PREFABRICATING AND CONVEYING CERAMIC PANELS

RELATED APPLICATION

This application is a division of my copending application Ser. No. 109,760 filed Jan. 26, 1971, now abandoned.

GENERAL CHARACTER OF THE INVENTION

This invention relates to a novel process and apparatus for prefabricating brick panels for transfer from the manufacturing premises to the site in which they are to be erected. In referring to "bricks" throughout this specification, it is at the outset explained that by such term it is intended to include bricks of all materials, of whatever shape, also hollow tiles, panels of rough-faced stonework, and all structural monolithic forms to which the method or process described may apply, or which may be prefabricated into panel form by the use of the means and method herein described.

Essentially the inventive idea may be synopsized in the following statement:

Panels of ceramic materials and particularly bricks are prefabricated within a sizing frame which is quickly connectable and disconnectable as to its four sides and may be pushed freely over a brick panel-supporting surface. The panels are prefabricated upon a figured templet lying upon said horizontal surface. The panels when prefabricated are transferred from the surface upon which they have been prefabricated to a receiving station where they are rotated into the vertical when they have become self-supporting. The receiving station may be in the form of a table surface tiltable from the horizontal into the vertical. The panels when in the vertical are placed in a common plane of their major axes. The panels are now coupled together and train-hauled to a curing and storage area. While in train-hauling movement the adhering templet aforesaid is stripped off.

DESCRIPTION OF THE PRIOR ART

It is common to prefabricate brick panels. One technique consists of prefabricating bricks upon, and bonding the same to, a rear concrete panel. Another consists of prefabricating brick panels upon an 'easel' positioned at an incline or in the subvertical. Still another technique utilizes a table which may be rotated into the vertical after the prefabrication of a panel thereon. With this last mentioned technique, to facilitate movement of the panels as with a crane or the like to a stacking station while the panels are fragile because the cement has not been fully cured, dowelling of the bricks in various ways has been resorted to, together with other ways of maintaining the integrity of the panel, such as cramping the panel between opposite edge clamps or clamping bars. All such techniques as are known are deemed to be too slow or costly or insusceptible to adequate quality control and hence liable to unacceptability in meeting building code specifications. All such methods as are known have failed to commend themselves to the brick industry of North America.

ADVANTAGES OF THE PRESENT INVENTION

An object of the present invention is to mechanize and reduce the labour costs incident to the subject matter of Canadian Pat. application No. 076288 filed Mar. 3, 1970, and corresponding U.S. Pat. application No. 4844 filed Jan. 22, 1970 for "Process Means and Method for Fabricating Brick Panels."

Another object is greatly to increase productivity of the basic method for prefabricating and conveying or transporting brick panels in the vertical as developed in the aforesaid patent applications and in this specification particularly having regard for the fact that the entire area of the horizontally disposed frame or jig into which bricks are placed in the prefabrication of a panel are now easily reachable by one or two operatives working from either side of the travelling table upon which said frame or jig is initially positioned.

Another object of the present invention resides in the use of the aforesaid frame or jig which is quickly connectable and disconnectable as to its four sides and has within it, thus constituting its floor a flexible brick joint and brick course defining means in the form of embossed or raised strips providing shallow rectangular cavities of the bricks to be used whereby quick and accurate spacing of the individual bricks to conform to modular dimensions is possible employing unskilled labour with the sides of the frame as desired being disconnected when the panel therewithin has become vertically self-supporting, the bricks while in the frame being capable of being pushed with the frame over the table surface of said travelling table onto a horizontally co-planar tilting table.

A yet further object of the present invention is to provide a frame as aforesaid the sides of which are slightly higher than the height of the bricks lying within the frame so that when a grout of cement is poured onto the bricks, such grout may be so poured as to lie flush with the upper edges of the frame and thus provide a mortar backing for the panel.

A still further object of the present invention is to provide means whereby a prefabricated spaced-brick panel may be mortar-grouted while lying horizontally with the front face down without any of said mortar leaking onto said front face whereby the necessity for scouring the front face and the time and effort which this involves is eliminated.

Still another object of the present invention facilitates the capability of rapidly consecutively placing spaced brick panels horizontally side by side on a tilting table where all said panels may be mortar-grouted in one operation thereby reducing the time required for each casting cycle, increasing productivity and reducing the manufacturing costs.

A yet further object of the present invention resides in grid or templet stripping means whereby the aforesaid templet is efficiently peeled off with a considerable saving of labour costs from the front faces of the finished panels, while they are rolled off the tilting table and on their way to the curing racks to leave a perfectly clean panel accurately sized and of superior workmanship.

With the foregoing in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Drawings in which:

FIG. 1 is a schematic plan representation of the organization constituting the present invention and depicting two tilting tables one at each opposite end of the intermediate travelling prefabricating table.

FIG. 2 is a fragmentary perspective representation of the novel travelling prefabricating table with a frame or jig thereon and also depicting a portion of the brick spacing means or grid and a partially prefabricated brick panel.

In the drawings, like characters of reference designate similar parts in the several Figures.

SUMMARY DESCRIPTION

Figure 5:
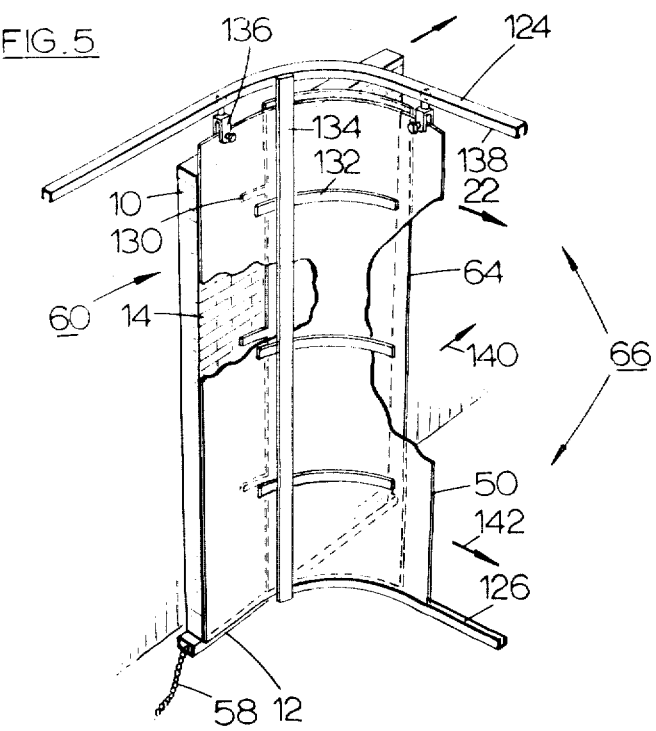
FIG. 5 is a fragmentary perspective representation depicting a completed panel being train-hauled and stripped by grid stripping means of its templet or grid shortly after being rolled off the adjacent tilting table.

To identify and import consonance of language used in this specification between the Disclosure and the Claims thereof in describing and defining the parts of the invention and their relationship the said invention, considered first as method, may initially be said to comprise the method steps of (i) positioning a plurality of ceramic panels 10 which have become self-supporting, each upon footing means 12 (FIG. 5) also indifferently called footing means, footing side or footing beam. With the major front and back surfaces 14 and 16 respectively in a common plane and (ii) coupling the panels as at 18 (FIG. 1) and train-hauling them to a curing and storage area.

The invention as method may also include the additional method steps of prefabricating panel 10 when formed of rectangular bricks 20 while at least substantially horizontal upon a figured templet 22 (also referred to as brick spacing means), prefabricating said panels on a movable horizontal surface 24 and transferring said panels from the movable surface to a receiving station 26 with further particularity receiving station 26 is a tilting table 28 or pair of the same and the method of the invention includes the additional step of stripping off the templets 22 (FIGS. 1 and 5) from adherence to panels 10 while they are in the aforesaid train-hauled motion.

The invention as method may otherwise be defined as comprising the method steps of prefabricating panels 10 within a frame 30 placed on movable horizontal surface 24 and sliding a panel prefabricated within frame 30 horizontally over surface 24 to receiving station 26 for rotation into the vertical, than moving surface 24 to another receiving station 32 after another brick panel has been prefabricated within a frame 30 placed on the moving surface 24.

The invention also comprises the method steps of the last preceding paragraph together with the additional steps of positioning a plurality of panels 10 when they have become self-supporting, each upon footing means, in the vertical, with their major surfaces 14 and 16 in common planes and then coupling them as at 18 for train-hauling as aforesaid.

The invention as method may importantly be described as characterized by the steps of (i) initially facilitating the joint-spaced arrangement of bricks 20 of panel 10 in frame 30 on moving surface 24, (ii) mortar-grouting the bricks while they lie horizontally to form complete panels, (iii) transferring the panels from moving surface 24 to tilting table 28, and (iv) rotating the panels on the tilting table into the vertical when they have become self-supporting.

Considered in terms of means or structure the invention may intially be described as apparatus for facilitating the prefabrication of ceramic panels which are usually though not necessarily rectangular brick panels which comprises a travelling prefabricating table 34 and means 36 in association with table 34 for transferring panels 10 from the table to an adjacent receiving station such as 26.

More specifically the panel receiving station has a straight panel reception edge 38 the table 34 being confined to movement parallel with and closely adjacent said edge.

More specifically the invention includes with the structure of the last preceding paragraph in combination therewith and in combination with the structure of this paragraph, a panel receiving station when in the form of an oblong tilting table 28 as previously referred to, the major axis 40 of the tilting table being parallel with the rotary axis thereof, the tilting table having a plurality of adjacent surface areas 42 for the reception of panels 10 side by side consecutively, and a common reception edge 44 rotatable approximately between the horizontal and the vertical, travelling table 34 being restricted to straight line travelling motion such that one end-edge 46 of the traveling table is adjacent to and parallel with reception edge 44.

More specifically the invention as means or structure includes the aforesaid brick panel assembly frame 30 movable between substantially co-planar horizontal panel supporting surface areas upon tables 28 and 34. More specifically the invention as structure includes means 22 in association with frame 30 for spacing apart bricks which are being assembled therein by the desired width of the mortar joints between the bricks and with stile heater particularly the brick-spacing means 22 just mentioned comprise essentially a flexible sheet 50 (preferably of light gauge steel) on which the bricks are assembled between mortar-joint defining and brick positioning means connectively designated 52 upon an exposed surface of said sheet. The exposed surface is, as exemplified the upper surface and the means 52 constitute a grid of neoprene strips 54 bounding shallow brick-receiving cavities 56.

More specifically, as means of structure, the invention includes in combination means 58 (FIG. 5) for conveying finished self-support panels 10 to storage and curing area in vertical position in the plane thereof and means of collectively designating 60 for removing the brick spacing means or mortar joint defining and brick positioning means 52 from adherence to panels 10 while the latter are in conveying motion.

Importantly the invention comprises in combination, a travelling brick panel prefabricating table 34, means in association with the table for transferring a collection of panels from the travelling table to an adjacent panel receiving station, together with a frame 30, 22 having a grid of projecting strips defining shallow cavities 56 in which bricks may be held spaced apart while being assembled within the frame by the desired width of mortar joints 48 between the bricks, the foregoing in combination with means 58 for conveying finished self-supporting panels 10 to a storage and curing area in vertical position in the plane thereof (meaning with their surfaces 14 and 16 co-planar) and means 60 for stripping 22 together with the strips 56 secured thereto from adherence to the panels while the panels are being conveyed as aforesaid.

Figure 3:
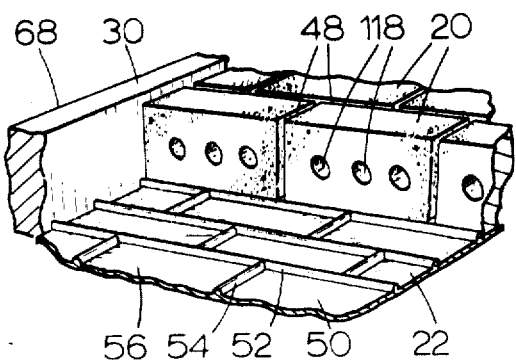
FIG. 3 is an enlarged fragmentary perspective representation of a portion of the frame or jig, the brick spacing means or neoprene grid therein and a plurality of bricks occupying the shallow cavities between the neoprene sponge strips of the grid.

The invention as structure also comprises with any of the structure thus far referred to a frame 30 which has separable sides 62 including the footing side 12 aforesaid, and the means 60 when including a curved deflector panel 64 and track means 66 for guiding flexible sheet 50 of means 52 (FIG. 3) on the take-off side of tilting table 28 for stripping 52 from adherence to the panels 10 while in train-hauled motion.

The invention as structured also comprises in combination with any of the foregoing structure a frame 30 of four sides, such sides embodying a pair of stiles 68, a transom 70 at one of the short ends, and the aforesaid footing 12, the sides being connectible and disconnectible with the frame freely slidable at least in the opposite directions indicated by double-headed arrow 72, the width of all four sides measured from the surfaces thereof which make contact with the surface of table 34 to the opposite surfaces 74 being slightly greater than the corresponding width of the bricks 20 intended to be contained within the frame as will be apparent from an inspection of FIG. 2. so as to provide a frame-flush backing layer 76 of mortar (FIG. 4) resulting from the shallow well which exists between the back surface 16 of the brick panel (FIG. 2) and the surfaces 74.

Figure 4:
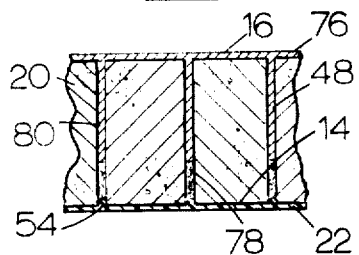
FIG. 4 is a fragmentary sectional elevation depicting the manner in which a mortar-grout is effected in connection with the method of the present invention.

The invention also includes the method steps best illustrated in the accompanying FIG. 4 of inserting a stiff mortar grout in the joint spaces 48 and forcing said grout downwardly to lie within the layer or front face stratum of the arrangement of bricks and be visible upon the major front surface 14, then introducing a relatively fluid mortar-grout 80 to the joints substantially to fill same, the stiff grout preventing leakage of the fluid grout downwardly therethrough onto the front face of surface 14, and then when the grouts have become sufficiently hardened to permit a panel prefabricated with the bricks and grouts to be self-supporting, rotating the said panel into the vertical.

DETAILED DESCRIPTION:

Preferably, though not necessarily, the apparatus and method of the present invention calls for a pair of parallel tilting tables 28 arranged to rotate between the horizontal and the vertical hinging substantially about the rare edges 82 so that the reception edges 44 ascend and descend in an arc. Travelling table 34 is restricted in virtue of the pair of rails 84 to straight line movement as indicated by double-headed arrow 86 between the tables 28 with the end-edges 46 of the travelling table closely contiguous with the edges 44 and the surfaces of all tables co-planar.

It will be observed that all tables are oblong, the major axes of tables 28 being at right angles to the major axis 88 of travelling table 34. Secured to the rare edges 82 of tables 28 is a lineup of rollers 90 projecting upwardly from the surface of the tilting tables when the same are considered horizontally as in the accompanying FIG. 1 to act as rolling pallets against which the panels 10 (or more correctly the footings 12 of the panels) when slid or pushed across from the surface of table 36 as will presently become apparent, however, in this connection it should be added that the tilting table and the aforesaid rolling pallets are disclosed in the aforesaid of the United States and Canada respectively, Pat. Nos. 4844 and 076288.

The travelling table 34 has a conventional understructure collectively designated 92 and is mounted upon two pairs of railroad wheels 94. The supporting platform 96 of table 34 is also provided with a pair of spaced and parallel slots 98 downwardly through which extends the lugs 100, same being part of means 36, which means in greater particularity has a prefabricated panel pusher assembly. In detail it comprises a pair of sprocket chains 102 to which lugs 100 are secured, the chains moving over sprockets 104 keyed to transverse shafts 106 one of which will be motor-driven. Resting upon the platform 96 is a formation collectively designated 108 to which the lugs 100 are secured. The transom 70 of frame 30 is seen to be provided with right-angled end lugs 110 aperatured so that they may be secured to the stiles 68 which are also aperatured as at 112. A plurality of pairs of opposite corresponding aperatures 112 should for preference be provided to allow for the prefabrication of different lengths of panel. The ends of footings 12 abut the adjacent ends of stiles 68 and may be made fast to the stiles by any convenient means within the skill of the artisan. The formation 108 includes or is associated with a buffer beam 114 capable of abutting the adjacent ends of the stiles 68. Thus it will be appreciated that frames of different effective width as well as length may be employed (with different lengths of transom 70).

The mortar joint defining and brick positioning means 52 lies within the boundaries of the frame 30 and has already been sufficiently described. It will be clear that the grid of neoprene sponge strips 54 secured to the upper surface of flexible sheet 50, being of the same dimensions as the bricks 20 will hold them very uniformly spaced and to an extent impossible to equal when laid by hand. When a panel is completed, reinforcing rods 116 are pushed through the aligned aperatures 118 in the bricks 20 and after the transom 70 has been removed. Such pushing-through of the said rods will in fact take place after the panel and frame, on the templet 22 have all been push-transferred from platform 96 onto one of the receiving stations 26 of tilting tables 28. At this point it is appropriate to mention that when a panel is to be pushed from off the platform 96 onto the tilting table on the other side of arrow 120 along which travelling table 34 rolls, the pusher formation 108 is transferred to the opposite end of the table from that shown in FIGS. No. 1 and 2 by detachment of the lugs 100 from the sprocket chains 102. When so transferred it is also reversed so that the buffer beam 114 is facing the opposite direction from that shown. This is a simple operation in virtue of the fact that the lugs 100 or other means by which the transfer means or pusher assembly 36 is grabbed by the sprocket chains is a means which, as such, can readily be designed and adapted to the present purpose by any skilled artisan without the exercise of invention.

When a set of panels 10 have been consecutively transferred as described from supporting platform 96 onto the several receiving stations 26 of tilting table 28, a stiff mortar grout is placed on the rear upper service of the horizontally-lying panel 10 and swept with a stiff brush into the joints. When it has disappeared into the joints it is tamped down between each joint dividing the courses and each joint dividing the bricks by means of long and short tamping bars so as to force the stiff grout downwardly against the strips 54 so that when they are removed the stiff grout will be exposed as slightly recessed upon the major front surface 14 of the panel. When the stiff grout has been thoroughly well packed down as aforesaid, a relatively fluid mortar grout is poured upon the exposed upper surface of the horizontal lying panel 10. With squeejees this relatively fluid grout is spread evenly over the rear panel brick surface so as to run into all the joints. More relatively fluid mortar is then poured on until it is flush with the surfaces 74 of the sides 62.

Reverting to the matter of reinforcing rods 116, it is to be understood that these should be the exact length of the panel 10. They may be pushed through as described, either before depositing mortar after the panel has been transferred to tilting table 28 with the transom 70 removed for the purpose and then reconnected. They can be inserted after the stiff grout has been inserted likewise. Lastly, they may be inserted after the panel has been completely mortared but before it is dry, though sufficiently dry again to permit the temporary removal for the purpose of the transom 70.

When the mortar of the panel is sufficiently dry to render the panel self-supporting, the surrounding frame is dismantled with the exception of the fitting side 12 which is permitted to remain in place and it is to be understood that the place which it occupies at this time is in contact with the rolling pallet 120 formed of the lineup of rollers 90 so that when the panel is vertical, without dropping at all, it will be supported on the rolling pallet via the footing 12.

It will therefore be appreciated that when the tilting table 28 is in the vertical, there will be a plurality of panels in a common plane upon the rolling pallet 120. When the footings 12 of the several pallets are coupled by the hook and chain means 58 already referred to, and a tractive effort is applied in the plane, the panels will be train-hauled to the right with respect to the accompanying FIG. 1.

The figured templet 22 adheres to the major front surface 14 during the train-hauling motion and it is designed to strip the same from the panel quickly and efficiently for re-use without stopping. This may be accomplished by the means 60 best illustrated in FIG. 5 where such means are shown to comprise upper and lower curved flexible sheet-guiding track means 66 in the form of opposed channels 124 and 126 respectively. Although not shown, for clarity of illustration, it is to be understood that a continuing rolling pallet 128 extends right up to the point where the rolling pallet 122 on the tilting table 28 turns. When a given panel 10 commences to be carried at the leading end thereof by the said continuing pallet a set of resilient fingers 130 and secured to vertical curved deflector panel 64 intercepts the leading edge of the templet 22 to become inserted between such templet and the adjacent front face of the panel. This forces the light gauge steel templet out of adhesive contact with the panel and compells it to assume the curvature of panel 64. It is also guided snugly against the panel 64 by means of the curved strips 132 secured to upright 134, the upper and lower ends of the said upright being secured against the corresponding flanges of channels 124 and 126.

By the aforesaid stripping and guiding means, the lower edge of templet 22 is led into channel 126. The upper edge is caught by a pair of spaced and swivelling clevises 136 having stems and upsets in virtue of which they may slide in the upper channel 134 due to the distal edges of the flanges 138 thereof being angled inwardly to retain the said upset. It will be appreciated of course that the upper end of upright 134 must be connected to channel 124 in a sufficiently spaced relationship such as will allow the elements 136 to ride therepast.

Thus movement of the panel 10 in the direction of arrow 140 compells the peel-off in the direction of arrows 142 of templet 22. The panels 10 proceed on to a curing and storage area from which without further processing of any kind they are ready to be transported to the site of construction and the footings returned for further use as parts of the frames 30. It will be appreciated that if desired only one tilting table and one rolling or travelling table may be employed. Since it is also to be understood that the tilting tables as such do not form part of the present invention the receiving areas 26 need not be tiltable but may be stationary surfaces for example from which the panels 10 when self-supporting and especially when reinforced may be rotated into the vertical as for example by winch means or in the alternative be permitted to rotate downwardly to a level below that of the fabricating table 34.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. Apparatus for facilitating the prefabrication of ceramic panels comprising a travelling prefabricating table and means in association with said table for transferring said panels from said travelling table to an adjacent panel-receiving station for rotation thereat into the vertical, a brick panel assembly frame, brick-spacing means movable between substantially coplanar horizontal panel-supporting surface-areas upon said table and said receiving station means in association with said frame for spacing apart bricks being assembled therein by the desired width of mortar-joints between said bricks, said brick-spacing means comprising essentially a flexible sheet on which said bricks are assembled between mortar-joint defining and brick positioning means upon an exposed surface of said sheet, and which includes in combination means for conveying finished self-supporting panels to a storage and curing area in vertical position in the plane thereof, and means for stripping said brick spacing means from adherence to said panels while said panels are in conveying motion.

2. The invention according to claim 1 which includes means for train-hauling a plurality of said panels in the common plane thereof to a storage and curing area.

3. Apparatus for facilitating the prefabrication of ceramic panels comprising a travelling prefabricating table and means in association with said table for transferring said panels from said travelling table to an adjacent panel receiving station for rotation thereat into the vertical, said panel receiving station being in the form of an oblong tilting table, the major axis of which is parallel with the rotary axis thereof, said tilting table having a plurality of adjacent surface areas for the reception of panels side by side consecutively, and a reception edge rotatable approximately between the horizontal and the vertical, the said travelling table being restricted to straight line travelling motion such that one end-edge of said travelling table is adjacent to and parallel with said reception edge, the said travelling table being oblong and having its major axis at rightangles to that of said tilting table, said travelling table being restricted to horizontal movement parallel with said major axis of said tilting table, one edge of said travelling table being closely adjacent said reception edge, the panel-supporting areas of said table being substantially co-planar, a rectangular brick panel assembly frame having separable sides and including a footing side, brick-spacing means including a flexible sheet within said frame, said bricks being placed upon said sheet, said frame being movable between said travelling table and said tilting table, means for trainhauling a plurality of fully fabricated panels after being rotated into the vertical in their common plane, supported on said footing side from the vicinity of said tables to a storage and curing area, and means including a curved deflector panel and a flexible-sheet-guiding track means on the take-off side of said tilting table for stripping said brick spacing means from adherence to said panels while in train-hauled motion.

* * * * *